US010233286B2

(12) United States Patent
Detering et al.

(10) Patent No.: US 10,233,286 B2
(45) Date of Patent: Mar. 19, 2019

(54) METHODS FOR PRODUCING POLYASPARTIC ACIDS IN THE PRESENCE OF METHANESULFONIC ACID

(71) Applicant: BASF SE, Ludwigshafen (DE)

(72) Inventors: Jürgen Detering, Limburgerhof (DE); Gazi Türkoglu, Mannheim (DE); Dietrich Fehringer, Dielheim (DE)

(73) Assignee: BASF SE (DE)

( * ) Notice: Subject to any disclaimer, the term of this patent is extended or adjusted under 35 U.S.C. 154(b) by 0 days.

(21) Appl. No.: 15/022,037

(22) PCT Filed: Sep. 8, 2014

(86) PCT No.: PCT/EP2014/069031
§ 371 (c)(1),
(2) Date: Mar. 15, 2016

(87) PCT Pub. No.: WO2015/036344
PCT Pub. Date: Mar. 19, 2015

(65) Prior Publication Data
US 2016/0229956 A1 Aug. 11, 2016

(30) Foreign Application Priority Data
Sep. 16, 2013 (EP) .................... 13184589

(51) Int. Cl.
| C11D 3/395 | (2006.01) |
| C11D 1/66 | (2006.01) |
| C11D 3/386 | (2006.01) |
| C08G 69/04 | (2006.01) |
| C08G 69/10 | (2006.01) |
| C08G 73/10 | (2006.01) |
| C11D 3/37 | (2006.01) |
| C08G 73/14 | (2006.01) |
| C11D 3/00 | (2006.01) |

(52) U.S. Cl.
CPC ............ *C08G 69/04* (2013.01); *C08G 69/10* (2013.01); *C08G 73/1092* (2013.01); *C08G 73/14* (2013.01); *C11D 3/0036* (2013.01); *C11D 3/3719* (2013.01); *C08G 2230/00* (2013.01); *Y02W 10/37* (2015.05)

(58) Field of Classification Search
CPC ... C11D 17/043; C11D 17/0091; C11D 3/395; C11D 1/66; C11D 3/386; C11D 3/3719; C08G 2230/00; C08G 69/04; C08G 69/1073; C08G 69/1092
See application file for complete search history.

(56) References Cited

U.S. PATENT DOCUMENTS

| 3,234,258 A | 2/1966 | Morris |
| 5,039,447 A | 8/1991 | Reuben |
| 5,075,041 A | 12/1991 | Lutz |
| 5,292,447 A | 3/1994 | Venturello et al. |
| 5,294,362 A | 3/1994 | Venturello et al. |
| 5,422,028 A | 6/1995 | Oakes et al. |
| 5,457,176 A | 10/1995 | Adler et al. |
| 5,508,434 A * | 4/1996 | Batzel ............... C08G 73/1092 528/328 |
| 5,556,938 A * | 9/1996 | Freeman ............... C08G 69/10 252/363.5 |
| 5,688,902 A * | 11/1997 | Bernard ............... C08G 69/10 524/706 |
| 5,710,327 A | 1/1998 | Kroner et al. |
| 5,747,635 A | 5/1998 | Kroner et al. |
| 5,856,427 A * | 1/1999 | Chou ............... C08G 73/1092 525/420 |
| 6,001,798 A | 12/1999 | Baur et al. |
| 6,235,704 B1 | 5/2001 | Detering et al. |
| 6,271,901 B1 | 8/2001 | Ide et al. |
| 6,380,350 B1 * | 4/2002 | Mukouyama ...... C08G 73/1092 528/328 |
| 6,462,006 B1 | 10/2002 | Sorg et al. |
| 7,790,800 B2 | 9/2010 | Suau et al. |
| 8,524,649 B2 | 9/2013 | Leyrer et al. |
| 2001/0012882 A1 * | 8/2001 | Ya. Mazo .......... C08G 73/1092 528/310 |
| 2012/0103370 A1 * | 5/2012 | Lingler ............... C11D 3/2089 134/25.2 |

FOREIGN PATENT DOCUMENTS

| CA | 2053900 A1 | 10/1990 |
| DE | 4221875 A1 | 1/1994 |
| DE | 19532717 A1 | 3/1997 |
| DE | 198 19 187 A1 | 11/1999 |

(Continued)

OTHER PUBLICATIONS

Fox, S., et al., "Thermal Polycondensation of Alpha-Amino Acids", A Laboratory Manual of Analytical Methods of Protein Chemistry vol. 4, Ed. P. Alexander & H. P. Ludgren, Oxford: Permagon Press, 1966, pp. 127-151.
International Search Report for PCT/EP2014/069031 dated Nov. 12, 2014.
U.S. Appl. No. 15/022,017, filed Mar. 15, 2016, Detering et al.
U.S. Appl. No. 15/022,007, filed Mar. 15, 2016, Detering et al.

*Primary Examiner* — Charles I Boyer
(74) *Attorney, Agent, or Firm* — Drinker Biddle & Reath LLP

(57) ABSTRACT

The present invention relates to methods for producing polyaspartic acids with a weight-average molecular weight (Mw) of from 6,000 to 15,000 g/mol. The invention also relates to polyaspartic acids which can be obtained by the method according to the invention, to a composition containing the polyaspartic acids, and to the use thereof as scale inhibitors, dispersants and as an additive in dishwashing agents, detergents or cleaning agents.

20 Claims, No Drawings

(56) References Cited

FOREIGN PATENT DOCUMENTS

| | | |
|---|---|---|
| EP | 0013836 A1 | 8/1980 |
| EP | 0747417 A1 | 12/1996 |
| EP | 851 023 A2 | 7/1998 |
| EP | 1083194 A1 | 3/2001 |
| JP | 58/217598 A | 12/1983 |
| RU | 2116321 C1 | 7/1998 |
| WO | WO-90/13533 A1 | 11/1990 |
| WO | WO-94/01486 A1 | 1/1994 |
| WO | WO-95/07331 A1 | 3/1995 |
| WO | WO-95/21882 A1 | 8/1995 |
| WO | 96/10025 * | 4/1996 |
| WO | WO-1996/10025 A1 | 4/1996 |
| WO | WO-9625450 A1 | 8/1996 |
| WO | WO-99/04313 A1 | 1/1999 |
| WO | WO-99/06524 A1 | 2/1999 |
| WO | WO-2006016035 A1 | 2/2006 |
| WO | WO-2009/019225 A2 | 2/2009 |
| WO | WO-2009/095645 A1 | 8/2009 |
| WO | WO-2011001170 A1 | 1/2011 |

* cited by examiner

METHODS FOR PRODUCING POLYASPARTIC ACIDS IN THE PRESENCE OF METHANESULFONIC ACID

CROSS-REFERENCE TO RELATED APPLICATIONS

This application is a national stage application (under 35 U.S.C. § 371) of PCT/EP2014/069031, filed Sep. 8, 2014, which claims benefit of European Application No. 13184589.3, filed Sep. 16, 2013, both of which are incorporated herein by reference in their entirety.

The present invention relates to methods for producing polyaspartic acids with a weight-average molecular weight (Mw) of 6000 to 15 000 g/mol. The present invention also relates to polyaspartic acids obtainable by the method according to the invention, composition comprising the polyaspartic acids, and also the use thereof as scale inhibitors, dispersants and as additive in dishwashing agents, detergents or cleaning agents.

Polymers obtainable by radical polymerization of carboxyl group-containing monomers have for many years been important constituents of phosphate-containing and phosphate-free machine dishwashing agents. By means of their soil-dispersing and scale-inhibiting effect, they provide a considerable contribution to the cleaning and rinsing performance of machine dishwashing agents. For instance, they ensure that no salt deposits of the hardness-forming calcium and magnesium ions remain on the washed dishes. Homopolymers and copolymers of acrylic acid are frequently used for this purpose.

Such polymers are also used in liquid and solid detergents. During the washing process, they actively support the washing performance of the surfactants and prevent graying of the wash due to their soil-dispersing properties. In addition, they act as incrustation inhibitors, i.e. they inhibit the undesired deposition of insoluble inorganic salts (e.g. insoluble carbonates and silicates) on the textile fabric.

Furthermore, such polymers are also used in water-conducting systems as agents for preventing mineral deposits, such as calcium sulfate and magnesium sulfate, magnesium hydroxide, calcium sulfate and barium sulfate and calcium phosphate, on heat transfer surfaces or in pipelines. Water-conducting systems here include, inter alia, cooling and boiler feed water systems and industrial process water. These polymers are also used as scale inhibitors in seawater desalination by distillation and by membrane processes such as reverse osmosis or electrodialysis.

A disadvantage of these polymers obtainable by radical polymerization of carboxyl group-containing monomers is that they are not biodegradable under aerobic conditions, such as prevail in a communal water treatment plant for example.

Due to increasing environmental awareness, the demand for biodegradable polymeric alternatives to polycarboxylates based on acrylic acid is therefore growing. Biodegradable polymers available on the market to date, such as polyaspartic acids or carboxymethylated inulin, have proven to be commercially viable only with difficulty. The reasons are manifold: excessive costs due to complex production methods and/or expensive starting materials or no, or only low, flexibility of the polymer synthesis. For instance, the methods practised to date for producing polyaspartic acid, in contrast to the methods for producing polyacrylic acids, do not allow large variations with respect to structure, molecular weight and degree of neutralization. The polyaspartic acid is obtained in neutralized form as the sodium salt. Depending on the production process, the molecular weights lie between 2000-3000 g/mol or between 5000-6000 g/mol. Adjustment of the polymer structure or of the molecular weight to specific application requirements by specific process changes is not possible or only to a very limited extent.

WO 2011/001170 describes cleaning compositions for machine dishwashing comprising polyaspartic acid, a liquid non-ionic surfactant and at least one solid non-ionic surfactant, although the preparation of the polyaspartic acid is not described.

Detergent and cleaning compositions are described in WO 2009/095645 as scale inhibitors, which comprise subsequently modified polyaspartic acids, having polyaspartic acid as backbone. The modified polyaspartic acids are obtained by reacting polyaspartic acid or polysuccinimide with PO/PE block copolymers, polyethyleneimine or adenosine triphosphate. With respect to its molecular weight, such a polyaspartic acid backbone cannot be adjusted or only with difficulty.

WO 1996/10025 describes the preparation of polyaspartic acid from aspartic acid and methanesulfonic acid by using specific bases at low temperatures, wherein a product yield of about 25% is achieved.

U.S. Pat. No. 5,457,176 describes the preparation of polyaspartic acid from aspartic acid and high amounts of methanesulfonic acid at high temperatures, in which high amounts of methanesulfonic acid also remain in the product. Yield and conversion rates are not described.

It was therefore an object of the present invention to provide a method for producing polymers, which
(1) may be used as additive in cleaning compositions, in washing compositions such as dishwashing compositions, in particular as additive to phosphate-free cleaning compositions and washing compositions for machine dishwashing, and as additive to liquid and solid detergents, and for the purposes of scale inhibition and/or dispersion in water-conducting systems,
(2) are adjustable in their polymer structure and in their molecular weight in a readily variable manner,
(3) have a high product yield, and
(4) are biodegradable.

This object was achieved by the present invention according to the claims and the description and examples which follow.

The present invention relates therefore to methods for producing polyaspartic acids with a weight-average molecular weight (Mw) of 6000 to 15 000 g/mol, comprising the following steps:
(i) polycondensation of
  (a) aspartic acid in the presence of
  (b) 1 to 15 mol %, preferably 2 to 13 mol %, particularly preferably 3 to 10 mol % methanesulfonic acid, based on the amount of aspartic acid used in (a),
  at a temperature of 170° C. to 230° C. for a time period of 1 minute to 50 hours;
(ii) subsequent hydrolysis of the polycondensates with addition of a base; and
(iii) optional acidification of the salts of polyaspartic acid obtained in (ii) with mineral acids, for example, sulfuric acid or hydrochloric acid.

The optional step (iii) of acidification of the polyaspartic acid salt in the method according to the invention serves to obtain the polyaspartic acid in acid form and can be carried out in a manner known to those skilled in the art and as is shown here by way of example. In the case that only the salt of polyaspartic acid is desired, for example, as intermediate, step (iii) in the context of the present invention can be omitted. If, in the context of the present invention, polyaspartic acid is in question, this also comprises accordingly its corresponding salts which are obtainable or are obtained according to step (ii) of the preparation process according to the invention and which are recognized by those skilled in the art.

As has been found in the context of the present invention, surprisingly, the adjusting of the weight-average molecular weight (Mw) of the polyaspartic acid to be produced is dependent on the amount of methanesulfonic acid used and the temperature applied in the polycondensation, wherein the optimum temperature in order to obtain polyaspartic acids with a relatively high molecular weight (≥6000 g/mol, or ≥10 000 g/mol) is between 170° C. and 230° C. Lower or higher temperatures result in lower weight-average molecular weights and/or a lower product yield, even when using larger amounts of catalyst (methanesulfonic acid). At higher temperatures, there is also the risk of an increasing thermal decomposition of the methanesulfonic acid with negative impacts on yield, degree of conversion and adjustment of molecular weight. The use of large amounts of methanesulfonic acid generally has the disadvantage that relevant amounts of methanesulfonic acid then remain in the product, which in turn can limit the applicability of the product.

The temperatures specified in the context of the present invention refer to the reaction temperature, unless stated otherwise. In one embodiment of the preparation process according to the invention, the polycondensation (i) is carried out at a temperature of 180° C. to 220° C., for example, at a temperature of 200° C. to 220° C.

The aspartic acid (a) used in the polycondensation step (i) in the preparation process according to the invention can be both L- and D-aspartic acid and DL-aspartic acid. Preference is given to using L-aspartic acid.

The amount of methanesulfonic acid (b) used in the polycondensation step (i) in the method according to the invention is in reference to the amount of aspartic acid (a) used, unless stated otherwise. In accordance with the invention, 1 to 15 mol % methanesulfonic acid are used. That is to say that if, for example, 10 mol of aspartic acid (a) are used in the polycondensation (i), 0.1 to 1.5 mol of methanesulfonic acid (b) are used. Preferably 2 to 13 mol %, particularly preferably 3 to 10 mol % methanesulfonic acid (b) are used, based on the amount of aspartic acid (a) used (in mol).

In the context of the present invention, methanesulfonic acid may be used in the form of its salts. Salts of methanesulfonic acid are obtainable, for example, by partial or complete neutralization of methanesulfonic acid with alkali metal hydroxides or alkaline earth metal hydroxides, ammonium hydroxide, primary, secondary or tertiary aliphatic amines or heterocyclic aromatic amines such as pyridine, imidazole or 1-methylimidazole. The secondary or tertiary aliphatic amines may also in this case be in cyclic form, for example, piperidine.

The polycondensation (i) of the preparation process according to the invention takes place for 1 minute to 50 hours, preferably 30 minutes to 20 hours and particularly preferably 1 hour to 15 hours.

In the context of the present invention, the quotient of the weight-average molecular weight (Mw) to the number-average molecular weight (Mn) of the polyaspartic acid produced may be, for example, at most 3, preferably at most 2.8, particularly preferably at most 2.5. The molecular weight distribution of the polyaspartic acid produced according to the invention may be determined, inter alia, by gel permeation chromatography (GPC), as is known to those skilled in the art. The molecular masses Mw and Mn specified in the context of the present invention refer to the sodium salts of the polyaspartic acids produced, which were freed from the methanesulfonic acid used as is known to those skilled in the art and described herein. This can be achieved, for example, by prior washing of the polyaspartimides formed in the polycondensation step with water and subsequent hydrolysis, for example, with aqueous sodium hydroxide solution.

The molecular masses Mw and Mn specified in the context of the present invention can be calculated, inter alia, with the aid of a calibration curve, which can be generated using narrowly distributed sodium polyacrylate standards from Polymer Standard Service having molecular weights of M=1250 g/mol to M=130 500 g/mol, as is known to those skilled in the art and as is shown in the examples. In addition, Na-acrylate having a molecular weight of M=96 and a PEG standard with M=620, which is synonymous with Na-PAA M=150, can be used, inter alia, for the calibration.

The base used in step (ii) of the method according to the invention can in principle be any base suitable to a person skilled in the art. Such bases comprise, inter alia, alkali metal and alkaline earth metal bases such as aqueous sodium hydroxide solution, aqueous potassium hydroxide solution, calcium hydroxide or barium hydroxide; carbonates such as sodium carbonate and potassium carbonate; ammonia and primary, secondary or tertiary amines; other bases having primary, secondary or tertiary amino groups. In one embodiment of the present invention, the base used in step (ii) of the method according to the invention is selected from the group consisting of aqueous sodium hydroxide solution, aqueous potassium hydroxide solution, calcium hydroxide, barium hydroxide, sodium carbonate, potassium carbonate, ammonia and ammonium hydroxide. In the context of the present invention, preference is given to aqueous sodium hydroxide solution or ammonium hydroxide.

The mineral acid used in optional step (iii) of the method according to the invention may be, for example, sulfuric acid or hydrochloric acid. However, any other acid is also possible, which is apparent to those skilled in the art as being suitable for the acidification of the salt of the polyaspartic acid to obtain the corresponding acid form. The acid form of the polyaspartic acid may also be obtained by treatment with an acidic ion exchanger such as Amberlite IR 120 (hydrogen form), by allowing the aqueous Na salt solution (or solution of another appropriate salt) of the polyaspartic acid to flow through a column packed with the acidic ion exchanger, for example.

The production of the polyaspartic acids to be used in accordance with the invention is generally carried out via a polycondensation of apartic acid with 1 to 15 mol % methanesulfonic acid (measured based on the amount of aspartic acid used) and subsequent hydrolysis of the polycondensates by the addition of a base as described here above and shown below. In the following, the production of the polyaspartic acids to be used in accordance with the invention is described by way of example. This preparation description is not to be understood as limiting with regard to the polyaspartic acids to be used in accordance with the invention. The polyaspartic acids to be used in accordance with the invention comprise, in addition to those which are produced according to the following preparation description, also those which can be produced by the following method. The polyaspartic acids to be used in accordance with the invention can be produced, for example, by polycondensation of aspartic acid and 1 to 15 mol % methanesulfonic acid as described herein. The polycondensation may be carried out at temperatures of 170° C. to 230° C., preferably at 190° C. to 220° C., for example, at 200° C. to 220° C. The condensation (the heat treatment) is preferably carried out under vacuum or under an inert gas atmosphere (e.g. $N_2$ or argon). The condensation can also be carried out at elevated pressure or in a gas stream, e.g. carbon dioxide, air, oxygen or steam. Depending on the reaction conditions selected, the reaction times for the condensation are generally between 1 minute and 50 hours. The amount of methanesulfonic acid required for the polycondensation of aspartic acid can be added in various ways. For instance, the polycondensation can be carried out in the solid phase for example, by firstly preparing an aqueous solution or suspension of aspartic acid and methanesulfonic acid and evaporating the solution to dryness. In this case, a condensation may already start. Furthermore, methanesulfonic acid or an aqueous solution of methanesulfonic acid may also be added to the reaction mixture in several portions or continuously over a defined time period or distributed over the entire course of the condensation. Suitable as reaction apparatus for the condensation are, for example, heating bands, kneaders, mixers, paddle dryers, hard phase dryers, extruders, rotary tube ovens and other heatable devices in which the condensation of solids may be carried out with removal of water of reaction. Convective apparatuses such as fluidized bed reactors, for example, are also suitable for the condensation. Polycondensates having low molecular weights can also be produced in pressure-tight sealed vessels in which the water of reaction present is not removed or only partially. The polycondensation can also be carried out in apparatuses in which the required thermal energy is supplied mainly by radiation of a defined frequency (e.g. infra-red, high frequency, microwave).

In the thermal polycondensation of aspartic acid with methanesulfonic acid, the polycondensate generally occurs in the form of water-insoluble polyaspartimides. The small amounts of methanesulfonic acid used may remain in the product without producing disadvantages in the applicability. If desired, however, the polycondensates of aspartic acid can be purified of the methanesulfonic acid, for example, by comminuting the water-insoluble polyaspartimide and extracting with water at temperatures of 10 to 100° C. In this case, the methanesulfonic acid used is washed out. Unreacted aspartic acid can be removed by extracting with 1N hydrochloric acid.

The polyaspartic acids (or salts thereof as described above) are preferably obtained from the polycondensates by slurrying the polycondensate in water and hydrolyzing at temperatures preferably in the range of 0° C. to 90° C. with addition of a suitable base described here and neutralization. The hydrolysis and neutralization preferably take place at pHs of 8 to 10. In the context of the invention, it is also advantageous to couple the condensation and the hydrolysis with each other in apparatus terms, for example by carrying out the hydrolysis in the same vessel/reactor/apparatus as the preceding condensation.

The present invention also further comprises the polyaspartic acid (or the salts as mentioned above) which is obtained or is obtainable by the method according to the invention.

The polyaspartic acids or salts thereof to be used or which are produced/preparable according to the invention, may be used as an aqueous solution or in solid form e.g. in powder form or granulated form. As is known to those skilled in the art, the powder or granulated form may be obtained, for example, by spray-drying, spray granulation, fluidized bed spray granulation, drum drying or freeze-drying of the aqueous solution of the polyaspartic acids or salts thereof.

The polyaspartic acids preparable in accordance with the invention are characterized by, inter alia, their very good scale-inhibiting and dispersing effect, and specifically with respect to both inorganic and organic deposits. In particular, they inhibit deposits of calcium carbonate and magnesium carbonate and calcium and magnesium phosphates and phosphonates. In addition, they prevent deposits which originate from the soil constituents of a rinse liquor, for example, fat, protein and starch deposits.

The present invention therefore also relates to the use of polyaspartic acids preparable according to the invention as scale inhibitors or dispersants. The polyaspartic acids can be used here both as additive in cleaning agents, dishwashing agents (particularly machine dishwashing agents) or detergents and also as scale inhibitors or dispersants in water-conducting systems as shown and described here.

The present invention also relates to compositions—particularly cleaning compositions, dishwashing compositions and detergent compositions—comprising polyaspartic acids which are preparable or obtainable by the method according to the invention. One embodiment of the present invention relates in particular to dishwashing compositions for machine dishwashing comprising the polyaspartic acids as described here.

Such compositions comprise, in addition to the polyaspartic acids of the invention, further constituents such as solvents, surfactants or complexing agents. The polyaspartic acids of the invention can be incorporated directly into the formulations (mixtures) in their various administration forms by the methods known to those skilled in the art. To be mentioned by way of example in this case are solid formulations such as powders, tablets, gel-like and liquid formulations. The machine dishwashing compositions according to the invention, and the other cleaning, dishwashing and detergent compositions, may be provided in liquid, gel-like or solid form, monophasic or multiphasic, as tablets or in the form of other dose units, packed or unpacked. In this context, the polyaspartic acids preparable according to the invention can be used both in multicomponent product systems (separate use of detergent, rinse aid and regenerating salt), and in such dishwashing agents in which the functions of detergent, rinse aid and regenerating salt are combined in one product (e.g. 3-in-1 products, 6-in-1 products, 9-in-1 products, all-in-one products).

The present invention therefore comprises further compositions comprising the polyaspartic acid prepared or preparable in accordance with the method according to the invention. One embodiment in this case takes the form of dishwashing compositions, particularly those which are suitable for machine dishwashing (ADW).

Dishwashing compositions according to the invention comprise, for example (a) 1-20% by weight, preferably 1-15% by weight, particularly preferably 2-12% by weight of the polyaspartic acid prepared or preparable in accordance with the invention and described here;
(b) 0-50% by weight complexing agents;
(c) 0.1-80% by weight builders and/or co-builders;
(d) 0.1-20% by weight non-ionic surfactants;
(e) 0-30% by weight bleach, bleach activators and bleach catalysts;
(f) 0-8% by weight enzymes; and
(g) 0-50% by weight additives.

Complexing agents (b) which may be used are, for example: nitrilotriacetic acid, ethylenediaminetetraacetic acid, diethylenetriaminepentaacetic acid, hydroxyethylethylenediaminetriacetic acid, methylglycinediacetic acid, glutamic acid diacetic acid, iminodisuccinic acid, hydroxyiminodisuccinic acid, ethylenediaminedisuccinic acid, aspartic acid diacetic acid, and also salts thereof in each case. Preferred complexing agents (b) are methylglycinediacetic acid and glutamic acid diacetic acid and salts thereof. Particularly preferred complexing agents (b) are methylglycinediacetic acid and salts thereof. Preference is given to 3 to 50% by weight complexing agents (b) according to the invention.

The builders and/or co-builders (c) used can be, in particular, water-soluble or water-insoluble substances of which the main task consists of binding calcium and magnesium ions. These can be low molecular weight carboxylic acids and also salts thereof such as alkali metal citrates, in particular anhydrous trisodium citrate or trisodium citrate dihydrate, alkali metal succinates, alkali metal malonates, fatty acid sulfonates, oxydisuccinate, alkyl or alkenyl disuccinates, gluconic acids, oxadiacetates, carboxymethyloxysuccinates, tartrate monosuccinate, tartrate disuccinate, tartrate monoacetate, tartrate diacetate and α-hydroxypropionic acid.

A further substance class with co-builder properties, which may be present in the cleaning agents according to the invention, are the phosphonates. These are in particular hydroxyalkane phosphonates or aminoalkane phosphonates. Among the hydroxyalkane phosphonates, 1-hydroxyethane-1,1-diphosphonate (HEDP) is of particular significance as co-builder. This is preferably used as the sodium salt, where the disodium salt reacts neutrally and the tetrasodium salt reacts as an alkali (pH 9). Suitable aminoalkanephosphonates are preferably ethylenediamine tetramethylenephosphonate (EDTMP), diethylenetriamine pentamethylenephosphonate (DTPMP) and also higher homologs thereof. They are preferably used in the form of the neutrally reacting sodium salts, for example, as hexasodium salt of EDTMP or as heptasodium and octasodium salt of DTPMP. The builder used in this case is preferably from the class of the phosphonates, preferably HEDP. Aminoalkane phosphonates additionally have a pronounced heavy metal binding capacity. Accordingly, it is preferable to use aminoalkane phosphonates, particularly DTPMP, or mixtures of the phosphonates mentioned, particularly if the agents also comprise bleach.

Silicates may be used, inter alia, as builders. Crystalline silicates in the form of layers may be present with the general formula $NaMSi_xO_{2x+1} \cdot yH_2O$, where M is sodium or hydrogen, x is a number from 1.9 to 22, preferably 1.9 to 4, although particularly preferred values for x are 2, 3 or 4 and y is a number from 0 to 33, preferably 0 to 20. In addition, amorphous sodium silicates can be used having an $SiO_2$: $Na_2O$ ratio of 1 to 3.5, preferably 1.6 to 3 and in particular 2 to 2.8. Furthermore, in the context of the dishwashing composition according to the invention, builders and/or co-builders (c) used may be carbonates and hydrogen carbonates, among which the alkali metal salts, particularly sodium salts, are preferred.

Furthermore, the co-builders used can be homopolymers and copolymers of acrylic acid or methacrylic acid preferably having a weight-average molar mass of 2000 to 50 000 g/mol. Suitable comonomers are in particular monoethylenically unsaturated dicarboxylic acids such as maleic acid, fumaric acid and itaconic acid and also anhydrides thereof such as maleic anhydride. Also suitable are comonomers containing sulfonic acid groups such as 2-acrylamido-2-methylpropanesulfonic acid, allylsulfonic acid and methanesulfonic acid. Hydrophobic comonomers are also suitable such as, for example, isobutene, diisobutene, styrene, alpha-olefins with 10 or more carbon atoms. Hydrophilic monomers having hydroxyl functions or alkylene oxide groups may also be used as comonomers. Examples include: allyl alcohol and isoprenol and also alkoxylates thereof and methoxypolyethylene glycol (meth)acrylate.

In the context of the dishwashing composition according to the invention, preferred amounts of builders and/or co-builders are 5 to 80% by weight, particularly preferably 10 to 75% by weight, 15 to 70% by weight or 15 to 65% by weight.

In the context of the dishwashing composition according to the invention, non-ionic surfactants (d) used can be, for example, weakly or low foaming non-ionic surfactants. These may be present in proportions of 0.1 to 20% by weight, preferably 0.1 to 15% by weight, particularly preferably 0.25 to 10% by weight or 0.5 to 10% by weight. Suitable non-ionic surfactants comprise, inter alia, surfactants of the general formula (I)

$$R^1\text{—O—}(CH_2CH_2O)_a\text{—}(CHR^2CH_2O)_b\text{—}R^3 \quad (I),$$

in which $R^1$ is a linear or branched alkyl residue having 8 to 22 carbon atoms,
$R^2$ and $R^3$ are each independently hydrogen or a linear or branched alkyl residue having 1 to 10 carbon atoms or H, where $R^2$ is preferably methyl, and
a and b are each independently 0 to 300. Preferably, a=1 to 100 and b=0 to 30.

Also suitable in the context of the present invention are surfactants of formula (II)

$$R^4\text{—O—}[CH_2CH(CH_3)O]_c[CH_2CH_2O]_d[CH_2CH(CH_3)O]_eCH_2CH(OH)R^5 \quad (II),$$

where $R^4$ is a linear or branched aliphatic hydrocarbon residue having 4 to 22 carbon atoms or mixtures thereof,
$R^5$ is a linear or branched hydrocarbon residue having 2 to 26 carbon atoms or refers to mixtures thereof,
c and e have values between 0 and 40, and
d is a value of at least 15.

Also suitable in the context of the present invention are surfactants of formula (III)

$$R^6O\text{—}(CH_2CHR^7O)_f(CH_2CH_2O)_g(CH_2CHR^8O)_h\text{—}CO\text{—}R^9 \quad (III),$$

in which $R^6$ is a branched or unbranched alkyl residue having 8 to 16 carbon atoms,
$R^7$, $R^8$ are each independently H or a branched or unbranched alkyl residue having 1 to 5 carbon atoms,
$R^9$ is an unbranched alkyl residue having 5 to 17 carbon atoms,
f, h are each independently a number from 1 to 5, and
g is a number from 13 to 35.

The surfactants of the formulae (I), (II) and (III) may be either random copolymers or block copolymers; they are preferably block copolymers.

Furthermore, in the context of the present invention, di- and multi-block copolymers constructed from ethylene oxide and propylene oxide are used, which are commercially available, for example, under the name Pluronic® (BASF SE) or Tetronic® (BASF Corporation). Furthermore, reaction products of sorbitan esters with ethylene oxide and/or propylene oxide can be used. Amine oxides or alkyl glycosides are also suitable. An overview of suitable non-ionic surfactants are disclosed in EP-A851 023 and DE-A 198 19 187.

Mixtures of different non-ionic surfactants may also be present. The dishwashing compositions according to the invention may further comprise anionic or zwitterionic surfactants, preferably in a mixture with non-ionic surfactants. Suitable anionic and zwitterionic surfactants are likewise specified in EP-A 851 023 and DE-A 198 19 187.

Bleach and bleach activators (e) used in the context of the dishwashing compositions according to the invention can be representatives known to those skilled in the art. Bleaches are subdivided into oxygen bleaches and chlorine bleaches. Oxygen bleaches used are alkali metal perborates and hydrates thereof, and also alkali metal percarbonates. Preferred bleaches in this context are sodium perborate in the form of the mono- or tetrahydrate, sodium percarbonate or the hydrates of sodium percarbonate. Likewise useable as oxygen bleaches are persulfates and hydrogen peroxide. Typical oxygen bleaches are also organic peracids such as perbenzoic acid, peroxy-alpha-naphthoic acid, peroxylauric acid, peroxystearic acid, phthalimidoperoxycaproic acid, 1,12-diperoxydodecanedioic acid, 1,9-diperoxyazelaic acid, diperoxoisophthalic acid or 2-decyldiperoxybutane-1,4-dioic acid. In addition, the following oxygen bleaches may also be used in the dishwashing composition: cationic peroxy acids, which are described in the patent applications U.S. Pat. No. 5,422,028, U.S. Pat. No. 5,294,362 and U.S. Pat. No. 5,292,447, and sulfonylperoxy acids, which are described in the patent application U.S. Pat. No. 5,039,447. Oxygen bleaches may be used generally in amounts of 0.1 to 30% by weight, preferably of 1 to 20% by weight, particularly preferably of 3 to 15% by weight, based on the overall dishwashing composition.

Chlorine-containing bleaches and the combination of chlorine-containing bleaches with peroxide bleaches may also be used in the context of the dishwashing compositions according to the invention. Known chlorine-containing bleaches are, for example, 1,3-dichloro-5,5-dimethylhydantoin, N-chlorosulfamide, chloramine T, dichloramine T, chloramine B, N,N'-dichlorobenzoyl urea, p-toluenesulfonedichloroamide or trichloroethylamine. Preferred chlorine-containing bleaches in this case are sodium hypochlorite, calcium hypochlorite, potassium hypochlorite, magnesium hypochlorite, potassium dichloroisocyanurate or sodium dichloroisocyanurate. Chlorine-containing bleaches may be used in this context in amounts of 0.1 to 30% by weight, preferably 0.1 to 20% by weight, preferably 0.2 to 10% by weight, particularly preferably 0.3 to 8% by weight, based on the overall dishwashing composition.

In addition, small amounts of bleach stabilizers, for example phosphonates, borates, metaborates, metasilicates or magnesium salts, may be added.

Bleach activators in the context of the present invention can be compounds which, under perhydrolysis conditions, give rise to aliphatic peroxocarboxylic acids having preferably 1 to 10 carbon atoms, in particular 2 to 4 carbon atoms, and/or substituted perbenzoic acid. In this case, suitable compounds comprise, inter alia, one or more N or O-acyl groups and/or optionally substituted benzoyl groups, for example substances from the class of the anhydrides, esters, imides, acylated imidazoles or oximes. Examples are tetraacetylethyienediamine (TAED), tetraacetylmethylenediamine (TAMD), tetraacetylglycoluril (TAGU), tetraacetylhexylenediamine (TAHD). N-acylimides such as N-nonanoyisuccinimide (NOSI), acylated phenol sulfonates such as n-nonanoyl- or isononanoyloxybenzenesulfonate (n- or iso-NOBS), pentaacetylglucose (PAG), 1,5-diacetyl-2,2-dioxohexahydro-1,3,5-triazine (DADHT) or isatoic anhydride (ISA). Also suitable as bleach activators are nitrile quats such as N-methylmorpholinium acetonitrile salts (MMA salts) or trimethylammonium acetonitrile salts (TMAQ salts). Preferred suitable bleach activators are from the group consisting of multiply acylated alkylenediamines, particularly preferably TAED. N-acylimides, particularly preferably NOSI, acylated phenol sulfonates, particularly preferably n- or iso-NOBS, MMA, and TMAQ. Bleach activators may be used in the context of the present invention in amounts of 0.1 to 30% by weight, preferably 0.1 to 10% by weight, preferably 1 to 9% by weight, particularly preferably 1.5 to 8% by weight, based on the overall dishwashing composition.

In addition to the conventional bleach activators or in place of them, so-called bleach catalysts may also be incorporated in rinse aid particles. These substances are bleach-enhancing transition metal salts or transition metal complexes such as salen complexes or carbonyl complexes of manganese, iron, cobalt, ruthenium or molybdenum. Also usable as bleach catalysts are complexes of manganese, iron, cobalt, ruthenium, molybdenum, titanium, vanadium and copper with nitrogen-containing tripod ligands and also amine complexes of cobalt, iron, copper and ruthenium.

The dishwashing compositions according to the invention may comprise 0 to 8% by weight enzymes as component (f). If the dishwashing compositions comprise enzymes, they comprise these preferably in amounts of 0.1 to 8% by weight. Enzymes may be added to the dishwashing agents in order to increase the cleaning performance or to ensure the same quality of cleaning performance under milder conditions (e.g. at low temperatures). The enzymes can be used in free form or a form chemically or physically immobilized on a support or in encapsulated form. The enzymes used most frequently in this context include lipases, amylases, cellulases and proteases. In addition, it is also possible, for example, to use esterases, pectinases, lactases and peroxidases. Preference is given to using amylases and proteases according to the invention.

In the context of the dishwashing compositions according to the invention, the additives (g) used can be, for example, anionic or zwitterionic surfactants, alkali carriers, polymeric dispersants, corrosion inhibitors, defoamers, dyes, fragrances, fillers, tablet disintegrants, organic solvents, tableting aids, disintegrants, thickeners, solubilizers or water. The alkali supports used can be for example, in addition to the ammonium or alkali metal carbonates already mentioned as builder substances, ammonium or alkali metal hydrogen carbonates and ammonium or alkali metal sesquicarbonates, also ammonium or alkali metal hydroxides, ammonium or alkali metal silicates and ammonium or alkali metal metasilicates and also mixtures of the aforementioned substances.

The corrosion inhibitors used may be, inter alia, silver protectants from the group of the triazoles, the benzotriazoles, the bisbenzotriazoles, the aminotriazoles, the alkylaminotriazoles and the transition metal salts or complexes.

To prevent glass corrosion, which is noticeable as cloudiness, iridescence, streaks and lines on the glasses, glass corrosion inhibitors are preferably used. Preferred glass corrosion inhibitors are, for example, magnesium, zinc and bismuth salts and complexes.

Paraffin oils and silicone oils may optionally be used in accordance with the invention as defoamers and to protect plastics and metal surfaces. Defoamers are used preferably in proportions of 0.001% by weight to 5% by weight. In addition, dyes, for example patent blue, preservatives, for example Kathon CG, perfumes and other fragrances may be added to the inventive cleaning formulation.

In the context of the dishwashing compositions according to the invention, a suitable filler is, for example, sodium sulfate.

In the context of the present invention, further possible additives include amphoteric and cationic polymers.

In one embodiment, the dishwashing composition according to the invention is phosphate-free. The term "phosphate-free" in this context also comprises such dishwashing compositions which essentially comprise no phosphate, i.e. phosphate in technically ineffective amounts. In particular, this comprises compositions having less than 1.0% by weight, preferably less than 0.5% by weight phosphate, based on the total composition.

The present invention further comprises the use of polyaspartic acid produced or preparable according to the invention or compositions comprising this as additive in dishwashing agents, particularly in dishwashing agents for machine dishwashing (ADW).

The present invention further relates to the use of polyaspartic acids preparable according to the invention as washing power enhancers, graying inhibitors and encrustation inhibitors in detergent compositions and cleaning compositions (e.g. as additives for detergents and cleaning agents for textiles, washing aids, laundry after-treatment agents).

The present invention further relates to cleaning compositions and detergent compositions comprising polyaspartic acids preparable according to the invention. The detergent and cleaning compositions, in which the polyaspartic acids according to the invention may be used, may be in the form of powder, granules, tablets, pastes, gel or liquid. Examples thereof are heavy-duty detergents, mild-action detergents, color detergents, wool detergents, net curtain detergents, modular detergents, washing tablets, bar soaps, stain salts, laundry starches and stiffeners and ironing aids. They comprise at least 0.1% by weight, preferably between 0.1 and 10% by weight and particularly preferably 0.2 to 5% by weight polyaspartic acids preparable according to the invention. The compositions are to be adapted according to their intended use in terms of their composition to the type of textiles to be washed or the surfaces to be cleaned. They comprise conventional detergent and cleaning ingredients, as correspond to the prior art. Representative examples of such detergent and cleaning ingredients and compositions are described below.

The present invention further relates to liquid or gel-like detergent and cleaning compositions comprising ($A_L$) 0.1 to 20% by weight of at least one polyaspartic acid described here and to be used according to the invention,
($B_L$) 1 to 80% by weight surfactants,
($C_L$) 0.1 to 50% by weight builders, co-builders and/or complexing agents,
($D_L$) 0 to 20% by weight bleach system,
($E_L$) 0.1 to 60% by weight detergent or cleaning ingredients, i.e. other customary ingredients such as alkali carriers, defoamers, enzymes (e.g. lipases, proteases, amylases, cellulases), dyes, fragrances, perfume carriers, graying inhibitors, dye transfer inhibitors, color protection additives, fiber protection additives, optical brighteners, soil release polyesters, corrosion inhibitors, bactericides and preservatives, organic solvents, solubilizers, pH modifiers, hydrotopes, thickeners, rheology modifiers and/or alkanolamines, and
($F_L$) 0 to 98.7% by weight water.

The sum total of ($A_L$) to ($F_L$) is 100% by weight.

The quantitative ratios of the individual components are adjusted by a person skilled in the art depending on the particular field of use of the liquid and gel-like detergent and cleaning composition.

The present invention further relates to solid detergent and cleaning compositions comprising ($A_F$) 0.1 to 20% by weight of at least one polyaspartic acid described here and to be used according to the invention,
($B_F$) 1 to 50% by weight surfactants,
($C_F$) 0.1 to 70% by weight builders, co-builders and/or complexing agents,
($D_F$) 0 to 30% by weight bleach system, and
($E_F$) 0.1 to 70% by weight detergent or cleaning ingredients, i.e. other customary ingredients such as modifiers (e.g. sodium sulfate), defoamers, enzymes (e.g. lipases, proteases, amylases, cellulases), dyes, fragrances, perfume carriers, graying inhibitors, dye transfer inhibitors, color protection additives, fiber protection additives, optical brighteners, soil release polyesters, corrosion inhibitors, bactericides and preservatives, dissolution promoters, disintegrants, process auxiliaries and/or water.

The sum of components ($A_F$) to ($E_F$) is 100% by weight.

The solid detergent and cleaning compositions can be present, for example, in the form of powder, granules, extrudates of tablets.

The quantitative ratios of the individual components are adjusted by a person skilled in the art depending on the particular field of use of the solid detergent and cleaning composition.

In the context of the present invention, the surfactants ($B_L$ or $B_F$) used may be, for example, non-ionic surfactants (Niosurfactants, NIS). The non-ionic surfactants used are preferably alkoxylated, advantageously ethoxylated, in particular primary alcohols having preferably 8 to 18 carbon atoms and, on average, 1 to 12 mol of ethylene oxide (EO) per mole of alcohol, in which the alcohol residue can be linear or preferably 2-methyl-branched and/or can comprise linear and methyl-branched residues in a mixture, as are customarily present in oxo alcohol residues. In particular, however, preference is given to alcohol ethoxylates with linear or branched residues from alcohols of native or petrochemical origin having 12 to 18 carbon atoms, for example from coconut alcohol, palm alcohol, tallow fat alcohol or oleyl alcohol, and, on average, 2 to 8 EO per mole of alcohol. The preferred ethoxylated alcohols include, for example, $C_{12}$-$C_{14}$-alcohols with 3 EO, 5 EO, 7 EO or 9 EO, $C_9$-$C_{11}$-alcohol with 7 EO, $C_{13}$-$C_{15}$-alcohols with 3 EO, 5 EO, 7 EO or 9 EO, $C_{12}$-$C_{18}$-alcohols with 3 EO, 5 EO, 7 EO or 9 EO and mixtures of these, such as mixtures of $C_{12}$-$C_{14}$-alcohol with 3 EO and $C_{12}$-$C_{18}$-alcohol with 7 EO, 2-propylheptanol with 3 to 9 EO. Mixtures of short-chain alcohol ethoxylates (e.g. 2-propylheptanol×7 EO) and long-chain alcohol ethoxylates (e.g. C16,18×7 EO). The stated degrees of ethoxylation are statistical average values (number-average. Mn) which can be an integer or a fraction for a specific product. Preferred alcohol ethoxylates have a narrowed homolog distribution (narrow range ethoxylates, NRE). In addition to these non-ionic surfactants, fatty alcohols with more than 12 EO can also be used. Examples thereof are tallow fatty alcohol with 14 EO, 25 EO, 30 EO or 40 EO. It is also possible to use non-ionic surfactants which comprise ethylene oxide (EO) and propylene oxide (PO) groups together in the molecule. In this context, it is possible to use block copolymers having EO-PO block units or PO-EO block units, but also EO-PO-EO copolymers or PO-EO-PO copolymers. It is of course also possible to use mixed alkoxylated non-ionic surfactants in which EO and PO units are not distributed blockwise, but randomly. Such products are obtainable by the simultaneous action of ethylene oxide and propylene oxide on fatty alcohols.

In addition, as further non-ionic surfactants according to the invention, it is also possible to use alkyl glycosides of the general formula (V)

in which $R^{10}$ is a primary straight-chain or methyl-branched, in particular 2-methyl-branched aliphatic residue having 8 to 22, preferably 12 to 18 carbon atoms, and G is a glycoside unit having 5 or 6 carbon atoms, preferably glucose. The degree of oligomerization i, which indicates the distribution of monoglycosides and oligoglycosides, is any desired number between 1 and 10; preferably i is 1.2 to 1.4.

In the context of the present invention, a further class of preferably used non-ionic surfactants, which are used either as the sole non-ionic surfactant or in combination with other non-ionic surfactants, are alkoxylated, preferably ethoxylated or ethoxylated and propoxylated fatty acid alkyl esters, preferably having 1 to 4 carbon atoms in the alkyl chain, in particular fatty acid methyl esters, as are described, for example, in the Japanese patent application JP 58/217598 or which are preferably prepared by the process described in the international patent application WO 90/13533. Non-ionic surfactants of the amine oxide type, for example N-cocoalkyl-N,N-dimethylamine oxide and N-tallow-alkyl-N,N-dihydroxyethylamine oxide, and the fatty acid alkanolamides may also be suitable in this context. The amount (the weight) of these non-ionic surfactants is preferably not more than that of the ethoxylated fatty alcohols, especially not more than half thereof.

Further suitable surfactants ($B_L$ or $B_F$) are polyhydroxy fatty acid amides according to the invention of formula (VI)

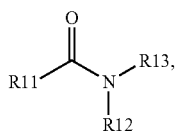
(VI)

where R11C(=O) is an aliphatic acyl residue having 6 to 22 carbon atoms. R12 is hydrogen, an alkyl or hydroxyalkyl residue having 1 to 4 carbon atoms and R13 is a linear or branched polyhydroxyalkyl residue having 3 to 10 carbon atoms and 3 to 10 hydroxyl groups. The polyhydroxy fatty acid amides are known substances which can typically be obtained by reductive amination of a reducing sugar with ammonia, an alkylamine or an alkanolamine and subsequent acylation with a fatty acid, a fatty acid alkyl ester or a fatty acid chloride. The group of the polyhydroxy fatty acid amides also includes compounds of the formula (VII) in this context

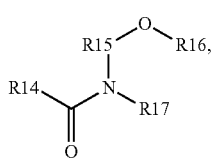
(VII)

in which R14 is a linear or branched alkyl or alkenyl residue having 7 to 12 carbon atoms. R15 is a linear, branched or cyclic alkylene residue having 2 to 8 carbon atoms or an arylene residue having 6 to 8 carbon atoms and R16 is a linear, branched or cyclic alkyl residue or an aryl residue or an oxyalkyl residue having 1 to 8 carbon atoms, where $C_1$-$C_4$-alkyl or phenyl residues are preferred, and R17 is a linear polyhydroxyalkyl residue whose alkyl chain is substituted with at least two hydroxyl groups, or alkoxylated, preferably ethoxylated or propoxylated, derivatives of this residue. R17 is preferably obtained by reductive amination of a sugar, for example glucose, fructose, maltose, lactose, galactose, mannose or xylose. The N-alkoxy- or N-aryloxy-substituted compounds can then be converted to the desired polyhydroxy fatty acid amides, for example, according to WO 95/07331 by reaction with fatty acid methyl esters in the presence of an alkoxide as a catalyst Surfactants ($B_L$ or $B_F$) may also be anionic surfactants (anionsurfactants) according to the invention. In the context of the present invention, the anionic surfactants used may be those of the sulfonate and sulfate type, for example. Suitable surfactants of the sulfonate type are preferably $C_9$-$C_{13}$-alkylbenzenesulfonates, olefinsulfonates, i.e. mixtures of alkene- and hydroxyalkanesulfonates, and also disulfonates, as are obtained, for example, from $C_{12}$-$C_{18}$-monoolefins with terminal or internal double bond by sulfonation with gaseous sulfur trioxide and subsequent alkaline or acidic hydrolysis of the sulfonation products. Also suitable are alkane sulfonates which are obtained from $C_{12}$-$C_{18}$-alkanes, for example by sulfochlorination or sulfoxidation with subsequent hydrolysis or neutralization. Likewise, the esters of α-sulfo fatty acids (ester sulfonates), for example the α-sulfonated methyl esters of hydrogenated coconut, palm kernel or tallow fatty acids, are also suitable. Further suitable anionic surfactants according to the invention are sulfated fatty acid glycerol esters. Fatty acid glycerol esters are to be understood to mean, inter alia, mono-, di- and triesters, and mixtures thereof, as are obtained in the preparation by esterification of a monoglycerol with 1 to 3 mol of fatty acid or during the transesterification of triglycerides with 0.3 to 2 mol of glycerol. Preferred sulfated fatty acid glycerol esters here are the sulfation products of saturated fatty acids having 6 to 22 carbon atoms, for example of caproic acid, caprylic acid, capric acid, myristic acid, lauric acid, palmitic acid, stearic acid or behenic acid.

The alk(en)yl sulfates are preferably the alkali metal and in particular the sodium salts of the sulfuric acid half-esters of $C_{12}$-$C_{18}$-fatty alcohols, for example of coconut fatty alcohol, tallow fatty alcohol, lauryl alcohol, myristyl alcohol, cetyl alcohol or stearyl alcohol or of the $C_{10}$-$C_{20}$-oxo alcohols and those half-esters of secondary alcohols of these chain lengths. Furthermore, preference is given to alk(en)yl sulfates of the specified chain length which comprise a synthetic, petrochemical-based straight-chain alkyl residue which have an analogous degradation behavior to the appropriate compounds based on fatty chemical raw materials. From a washing point of view, the $C_{12}$-$C_{16}$-alkyl sulfates and $C_{12}$-$C_{15}$-alkyl sulfates and also $C_{14}$-$C_{15}$-alkyl sulfates are preferred. 2,3-Alkyl sulfates, which are prepared, for example, in accordance with the US patent specifications U.S. Pat. No. 3,234,258 or U.S. Pat. No. 5,075,041 and can be obtained as commercial products from the Shell Oil Company under the name DAN®, are also suitable anionic surfactants. The sulfuric acid monoesters of the straight-chain or branched $C_7$-$C_{21}$-alcohols ethoxylated with 1 to 6 mol of ethylene oxide, such as 2-methyl-branched $C_9$-$C_{11}$-alcohols with on average 3.5 mol of ethylene oxide (EO) or $C_{12}$-$C_{18}$-fatty alcohols with 1 to 4 EO, inter alia, are also suitable. On account of their high foaming behavior, they are used in cleaning agents only in relatively small amounts, for example in amounts from 1 to 5% by weight. In the context of the present invention, further suitable anionic surfactants are also the salts of alkylsulfosuccinic acid, which are also referred to as sulfosuccinates or as sulfosuccinic acid esters and which constitute monoesters and/or diesters of sulfosuccinic acid with alcohols, preferably fatty alcohols and in particular ethoxylated fatty alcohols. Preferred sulfosuccinates comprise $C_8$-$C_{18}$-fatty alcohol residues or mixtures thereof. Particularly preferred sulfosuccinates comprise a fatty alcohol residue derived from ethoxylated fatty alcohols. In this connection, particular preference is in turn given to sulfosuccinates whose fatty alcohol residues are derived from ethoxylated fatty alcohols with a narrow homolog distribution. It is likewise also possible to use alk(en)ylsuccinic acid having preferably 8 to 18 carbon atoms in the alk(en)yl chain or salts thereof.

Particularly preferred anionic surfactants are soaps. Saturated and unsaturated fatty acid soaps, such as the salts of lauric acid, myristic acid, palmitic acid, stearic acid, (hydrogenated) erucic acid and behenic acid, and also soap mixtures derived in particular from natural fatty acids, for example coconut, palm kernel, olive oil or tallow fatty acids, are suitable.

The anionic surfactants including the soaps can be present according to the invention in the form of their sodium, potassium or ammonium salts, and also as soluble salts of organic bases, such as mono-, di- or triethanolamine. Preferably, the anionic surfactants are present in the form of their sodium or potassium salts, in particular in the form of the sodium salts.

In the context of the present invention, the surfactants ($B_L$ or $B_F$) used may also be cationic surfactants. Particularly suitable cationic surfactants that may be mentioned here, for example, are:

$C_7$-$C_{25}$-alkylamines;
N,N-dimethyl-N-(hydroxy-$C_7$-$C_{25}$-alkyl)ammonium salts;
mono- and di($C_7$-$C_{25}$-alkyl)dimethylammonium compounds quaternized with alkylating agents;
ester quats, in particular quaternary esterified mono-, di- and trialkanolamines which are esterified with $C_8$-$C_{22}$-carboxylic acids;
imidazoline quats, in particular 1-alkylimidazolinium salts of formulae VIII or IX

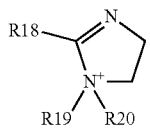

(VIII)

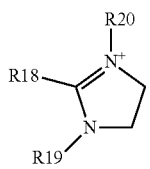

(IX)

where the variables are each defined as follows:
R18 $C_1$-$C_{25}$-alkyl or $C_2$-$C_{25}$-alkenyl;
R19 $C_1$-$C_4$-alkyl or hydroxy-$C_1$-$C_4$-alkyl;
R20 $C_1$-$C_4$-alkyl, hydroxy-$C_1$-$C_4$-alkyl or a $R_1$—(CO)—$R^{21}$—(CH$_2$)$_j$—($R^{21}$: —O— or —NH—; j: 2 or 3) residue, where at least one R18 residue is a $C_7$-$C_{22}$-alkyl.

In the context of the present invention, the surfactants ($B_L$ or $B_F$) may also be amphoteric surfactants. Suitable amphoteric surfactants here are, e.g. alkylbetaines, alkylamidebetaines, aminopropionates, aminoglycinates and amphoteric imidazolium compounds.

The content of surfactants in liquid and gel-like detergent and cleaning compositions according to the invention is preferably 2 to 75% by weight and in particular 5 to 65% by weight, based in each case on the total composition.

The content of surfactants in solid detergent and cleaning compositions according to the invention is preferably 2 to 40% by weight and in particular 5 to 35% by weight, based in each case on the total composition.

In the context of the present invention, suitable as builders, co-builders and/or complexing agents ($C_L$ oder $C_F$), inter alia, are inorganic builders such as:

crystalline and amorphous alumosilicates with ion-exchanging properties, such as in particular zeolites: Various types of zeolites are suitable, especially zeolites A, X, B, P, MAP and HS in the sodium form thereof, or in forms in which Na has been partially exchanged for other cations such as Li, K, Ca, Mg or ammonium.

crystalline silicates, such as in particular disilicates and sheet silicates, e.g. δ- and β-$Na_2Si_2O_5$. The silicates can be used in the form of their alkali metal, alkaline earth metal or ammonium salts, preference being given to the Na, Li and Mg silicates;

amorphous silicates, such as sodium metasilicate and amorphous disilicate;

carbonates and hydrogen carbonates: These can be used in the form of their alkali metal, alkaline earth metal or ammonium salts. Preference is given to Na, Li and Mg carbonates and hydrogen carbonates, in particular sodium carbonate and/or sodium hydrogen carbonate; and polyphosphates, such as pentasodium triphosphate.

In the context of the present invention, suitable as co-builders and complexing agents ($C_L$ or $C_F$), inter alia, are;

low molecular weight carboxylic acids such as citric acid, hydrophobically modified citric acid, e.g. agaric acid, malic acid, tartaric acid, gluconic acid, glutaric acid, succinic acid, imidodisuccinic acid, oxydisuccinic acid, propanetricarboxylic acid, butanetetracarboxylic acid, cyclopentanetetracarboxylic acid, alkyl- and alkenylsuccinic acids and aminopolycarboxylic acids, e.g. nitrilotriacetic acid, β-alaninediacetic acid, ethylenediaminetetraacetic acid, serinediacetic acid, isoserinediacetic acid. N-(2-hydroxyethyl)iminoacetic acid, ethylenediaminedisuccinic acid, glutamic acid diacetic acid and methyl- and ethylglycinediacetic acid or alkali metal salts thereof;

oligomeric and polymeric carboxylic acids, such as homopolymers of acrylic acid, copolymers of acrylic acid with sulfonic acid group-containing comonomers such as 2-acrylamido-2-methylpropanesulfonic acid (AMPS), allylsulfonic acid and vinylsulfonic acid, oligomaleic acids, copolymers of maleic acid with acrylic acid, methacrylic acid or $C_2$-$C_{22}$-olefins, e.g. isobutene or long chain α-olefins, vinyl-$C_1$-$C_8$-alkyl ethers, vinyl acetate, vinyl propionate, (meth)acrylic esters of $C_1$-$C_8$-alcohols and styrene. Preference is given to the homopolymers of acrylic acid and copolymers of acrylic acid with maleic acid or AMPS. The oligomeric and polymeric carboxylic acids are used in acid form or as the sodium salt.

phosphonic acids such as 1-hydroxyethylene(1,1-diphosphonic acid), aminotri(methylenephosphonic acid), ethylenediaminetetra(methylenephosphonic acid) and diethylenetriaminepenta(methylenephosphonic acid) and alkali metal salts thereof.

Suitable as bleaches ($D_L$ or $D_F$) according to the invention, inter alia, are; sodium perborate tetrahydrate, sodium perborate monohydrate, sodium percarbonate, peroxypyrophosphates, citrate perhydrates and also peracid salts or peracids such as perbenzoates, peroxophthalates, diperazelaic acid, phthaloiminoperacid or diperdodecanedioic acid. In order to wash at temperatures of 60° C. and to achieve an improved bleach effect, bleach activators according to the invention may be incorporated in the detergents or cleaning agents. Bleach activators used can be, for example, compounds which, under perhydrolysis conditions, give rise to aliphatic peroxocarboxylic acids having preferably 1 to 10 carbon atoms, in particular 2 to 4 carbon atoms, and/or optionally substituted perbenzoic acid. Suitable are substances, inter alia, which bear O-acyl and/or N-acyl groups of the carbon atom number specified and/or optionally substituted benzoyl groups. In accordance with the invention, multiply acylated alkylenediamines are preferred, in particular tetraacetylethylenediamine (TAED), acylated triazine derivatives, particularly 1,5-diacetyl-2,4-dioxohexahydro-1,3,5-triazine (DADHT), acylated glycolurils, in particular tetraacetylglycoluril (TAGU)1 N-acylirnides, particularly N-nonanoylsuccinimide (NOSI), acylated phenol sulfonates, particularly n-nonanoyl- or isononanoyloxybenzenesulfonate (n- or iso-NOBS), carboxylic anhydrides, particularly phthalic anhydride, acylated polyhydric alcohols, in particular triacetin, ethylene glycol diacetate and 2,5-diacetoxy-2,5-dihydrofuran. In addition to the conventional bleach activators or in place of them, so-called bleach catalysts may also be incorporated in accordance with the invention as constituents ($D_L$) in the liquid detergent or cleaning agent. These substances are bleach-enhancing transition metal salts or transition metal complexes such as salen complexes or carbonyl complexes of Mn, Fe, Co, Ru or Mo. Also usable as bleach catalysts are complexes of Mn, Fe, Co, Ru, Mo, Ti, V and Cu with nitrogen-containing tripod ligands and also amine complexes of Co, Fe, Cu and Ru.

Customary ingredients for cleaning or detergent compositions ($E_L$ or $E_F$) are known to those skilled in the art and comprise, for example, alkali carriers, defoamers, enzymes (e.g. lipases, proteases, amylases, cellulases), dyes, fragrances, perfume carriers, graying inhibitors, dye transfer inhibitors, color protection additives, fiber protection additives, optical brighteners, soil release polyesters, corrosion inhibitors, bactericides and preservatives, organic solvents, solubilizers, pH modifiers, hydrotopes, thickeners, rheology modifiers and/or alkanolamines for liquid or gel-like cleaning or detergent compositions ($E_L$), or modifiers (e.g. sodium sulfate), defoamers, enzymes (e.g. lipases, proteases, amylases, cellulases), dyes, fragrances, perfume carriers, graying inhibitors, dye transfer inhibitors, color protection additives, fiber protection additives, optical brighteners, soil release polyesters, corrosion inhibitors, bactericides and preservatives, dissolution promoters, disintegrants, process auxiliaries and/or water for solid cleaning or detergent compositions ($E_F$).

Suitable enzymes ($E_L$ or $E_F$) according to the invention are in particular those from the classes of the hydrolases, such as the proteases, esterases, lipases or lipolytic enzymes, amylases, cellulases and other glycosyl hydrolases and mixtures of said enzymes. All of these hydrolases contribute during washing to the removal of stains such as protein-, fat- or starch-containing stains and graying. Cellulases and other glycosyl hydrolases can moreover contribute to the color retention and to increasing the softness of the textile by removing pilling and microfibrils. Oxyreductases can also be used for the bleaching or for the inhibition of color transfer. Of particularly good suitability are active enzymatic ingredients obtained from bacterial strains or fungi such as *Bacillus subtilis, Bacillus licheniformis, Streptomyceus griseus* and *Humicola insolens*. Preference is given to using proteases of the subtilisin type and in particular proteases which are obtained from *Bacillus lentus*. Here, enzyme mixtures, for example of protease and amylase or protease and lipase or lipolytic enzymes or protease and cellulase or of cellulase and lipase or lipolytic enzymes or of protease, amylase and lipase or lipolytic enzymes or protease, lipase or lipolytic enzymes and cellulase, but in particular protease and/or lipase-containing mixtures or mixtures with lipolytic enzymes are of particular interest. Examples of such lipolytic enzymes are known cutinases. Peroxidases or oxidases may also be used in this case. The suitable amylases include especially α-amylases, isoamylases, pullulanases and pectinases. Cellulases used are preferably cellobiohydrolases, endoglucanases and β-glucosidases, which are also called cellobiases, or mixtures of these. Since different cellulase types differ by their CMCase and avicelase activities, it is possible to establish the desired activities by means of selected mixtures of the cellulases.

The enzymes according to the invention may be adsorbed on carrier substances in order to protect them from premature breakdown. The fraction of the enzymes, enzyme mixtures or enzyme granules can be, for example, about 0.1 to 5% by weight, preferably 0.12 to about 2.5% by weight, based on the total formulation.

Suitable graying inhibitors ($E_L$ or $E_F$) are, for example, carboxymethylcellulose, graft polymers of vinyl acetate on polyethylene glycol, and alkoxylates of polyethylenimine.

As thickeners ($E_L$), so-called associative thickeners may be used. Suitable examples of thickeners are known to those skilled in the art and are described, inter alia, in WO 2009/019225 A2, EP 013 836 or WO 2006/016035.

In the context of the present invention, optical brighteners (so-called "whiteners") ($E_L$ or $E_F$) can be added to the liquid detergents or cleaning agents in order to eliminate graying and yellowing of the treated textile fabrics. These substances attach to the fibers and bring about a brightening and quasi bleaching effect by converting invisible ultraviolet radiation into visible longer-wave light, where the ultraviolet light absorbed from the sunlight is emitted as pale bluish fluorescence and produces pure white with the yellow shade of grayed and/or yellowed laundry. Suitable compounds originate, for example, from the substance classes of the 4,4'-diamino-2,2'-stilbenedisulfonic acids (flavonic acids), 4,4'-distyrylbiphenylene, methylumbelliferones, coumarins, dihydroquinolinones, 1,3-diarylpyrazolines, naphthalimides, benzoxazole, benzisoxazole and benzimidazole systems, and the pyrene derivatives substituted by heterocycles. The optical brighteners are usually used in amounts between 0.03 and 0.3% by weight, based on the finished composition.

Suitable color transfer inhibitors ($E_L$ or $E_F$) according to the invention are, for example, homopolymers, copolymers and graft polymers of 1-vinylpyrrolidone, 1-vinylimidazole or 4-vinylpyridine N-oxide. Homopolymers and copolymers of 4-vinylpyridine reacted with chloroacetic acid are also suitable as color transfer inhibitors.

Detergent ingredients are otherwise generally known. Detailed descriptions can be found, for example, in WO 99/06524 and WO 99/04313; in Liquid Detergents, Editor:

Kuo-Yann Lai, Surfactant Sci. Ser., Vol. 67, Marcel Decker, N.Y., 1997, pp. 272-304. Further detailed descriptions of detergent and cleaning agent ingredients are found, for example, in: Handbook of Detergents, Part D: Formulation, Surfactant Sci Ser, Vol. 128, Editor: Michael S. Showell, CRC Press 2006; Liquid Detergents sec. Edition, Surfactant Sci Ser, Vol. 129, Editor: Kuo-Yann Lai, CRC Press 2006; or Waschmittel: Chemie, Umwelt, Nachhaltigkeit, (Detergents: chemistry, environment, sustainability), Günter Wagner, Wiley-VCH Verlag GmbH & Co. KGaA, August 2010.

As has been found in the context of the present invention, the polyaspartic acid produced or preparable in accordance with the invention described here is very well-suited as calcium carbonate scale inhibitor. The present invention therefore further comprises the use of polyaspartic acids produced or preparable according to the invention or compositions comprising these as scale inhibitors, preferably as calcium carbonate scale inhibitors.

The invention further relates to the use polyaspartic acids according to the invention or mixtures thereof as scale inhibitors or dispersants in water-conducting systems. Water-conducting systems in which polyaspartic acids, preparable by the method according to the invention, can be used are in principle all systems which come into contact permanently or periodically with water such as seawater, brackish water, river water, urban or industrial wastewater or industrial process water such as cooling water and in which scale formation can occur.

Water-conducting systems in which the polymers according to the invention may be used are, in particular, seawater desalination plants, brackish water desalination plants, cooling water systems and boiler feed water systems, boilers, heaters, continuous-flow heaters, hot water storers, cooling towers, cooling water circuits and other industrial process waters. The desalination plants can be of a thermal nature or based on membrane processes such as reverse osmosis or electrodialysis.

In general, the polymers according to the invention are added to the water-conducting systems in amounts of 0.1 mg/l to 100 mg/l. The optimal dosage is determined by the requirements of the respective application or according to the operating conditions of the relevant process. For instance, in thermal seawater desalination, the polymers are preferably used at concentrations of 0.5 mg/l to 10 mg/l. Polymer concentrations of up to 100 mg/l are used in industrial cooling circuits or boiler feed water systems. Water analyses are often carried out in order to determine the fraction of scale-forming salts and thus the optimal dosage.

Formulations may also be added to the water-conducting systems which may comprise, in addition to the polymers according to the invention and depending on requirements, inter alia, phosphonates, polyphosphates, zinc salts, molybdate salts, organic corrosion inhibitors such as benzotriazole, tolyltriazole, benzimidazole or ethynyl carbinol alkoxylates, biocides, complexing agents and/or surfactants. Examples of phosphonates are 1-hydroxyethane-1,1-diphosphonic acid (HEDP), 2-phosphonobutane-1,2,4-tricarboxylic acid (PBTC), aminotrimethylenephosphonic acid (ATMP) diethylenetriaminepenta(methylenephosphonic acid) (DTPMP) and ethylenediaminetetra(methylenephosphonic acid) (EDTMP), which are used in each case in acid form or sodium salts thereof.

The following examples serve to illustrate the present invention and are not to be understood as limiting it.

EXAMPLES

Example 1

Preparation of Polyaspartic Acids

Polymers 1-6 and C2:
133.10 g of L-aspartic acid, 30 g of water and the amount of methanesulfonic acid specified in Table 1 were initially charged in a 2 l capacity reactor equipped with stirrer and temperature sensor. The reaction mixture was heated to the condensation temperature of 210° C. to 220° C. with stirring under a gentle stream of nitrogen and condensed at this temperature for 6 hours with simultaneous removal of water by distillation. After the reaction was complete, the polyaspartimide obtained was comminuted and cooled. In order to prepare the aqueous solution of polyaspartic acid sodium salt, 100 g of the polyaspartimide formed by the condensation step was dispersed in 100 g of water, the mixture was heated to 70° C. and sufficient 50% aqueous sodium hydroxide solution was added at this temperature so that the pH was in the range of 7-9. The powder dispersed in water dissolved gradually and a clear aqueous solution of the sodium salt of polyaspartic acid was obtained. The residual content of unreacted aspartic acid was determined by $^1$H-NMR spectroscopy. This was <0.5% by weight based on the aspartic acid used.

TABLE 1

Polyaspartic acids

| Polymer | MeSO$_3$H [g] | Molar ratio L-Asp:MeSO$_3$H | Mn [g/mol] | Mw [g/mol] | Mw/Mn |
|---|---|---|---|---|---|
| 1 | 2.4 | 40:1 | 2967 | 7323 | 2.5 |
| 2 | 4.81 | 20:1 | 3212 | 7713 | 2.4 |
| 3 | 7.21 | 13.3:1 | 4109 | 8492 | 2.1 |
| 4 | 9.61 | 10:1 | 4305 | 10630 | 2.5 |
| 5 | 12.01 | 8:1 | 4613 | 11430 | 2.5 |
| 6 | 13.9 | 6.9:1 | 4790 | 13750 | 2.5 |
| C2 | 38.4 | 2.5:1 | 5450 | 19110 | 3.5 |

Polymer C1:
133.10 g of L-aspartic acid were polycondensed at a temperature of 210-220° C. for 2 h in a rotary evaporator. The resulting polyaspartimide was hydrolyzed to give an aqueous solution of polyaspartic acid sodium salt in a manner analogous to polymer 1-6 and C2. The weight-average molecular weight Mw was 5400 g/mol.
Polymer C3:
Polyaspartic acid was prepared according to the description of Example 5 from U.S. Pat. No. 5,457,176. The amount of MeSO$_3$H (3 g) used was 15.4 mol % based on the amount of L-aspartic acid (27 g) used, the molar ratio L-Asp: MeSO$_3$H was thus 6.5:1. The polycondensation was carried out at 240° C. as described in Example 5 of U.S. Pat. No. 5,457,176 and had to be interrupted repeatedly in order to comminute the solid mass formed. The resulting product was subjected to a CaCO$_3$ inhibition test as described herein, see Table 2b.

Example 2

Determination of the Molecular Weight (Mw and Mn)

The weight-average or number-average molecular weight (Mw and Mn) of the examples was determined by GPC (gel permeation chromatography) under the following conditions:

| | |
|---|---|
| Column | PSS SUPREMA analytical linear M (Material: polyhydroxymethacrylate copolymer network Length: 300 mm, diameter 8 mm, particle size 10μ) |
| Eluent | 0.08 mol/l TRIS buffer pH 7.0 in dist. water + 0.15 mol/l NaCl + 0.01 mol/l NaN$_3$. |
| Column temperature | 35° C. |
| Flow rate | 0.8 ml/min |
| Injection | 100 μL |
| Concentration | 1.5 mg/ml |
| Detector | DRI Agilent 1100UV GAT-LCD 503 (260 nm) |

To determine the molecular weight, a small amount of the polyaspartimide formed in the polycondensation step was taken and washed repeatedly with water in order to remove the methanesulfonic acid used. The washed powder was than hydrolyzed as described with aqueous sodium hydroxide solution (i.e. the washed powder was dispersed in water, the mixture was heated to 70° C. and sufficient 50% aqueous sodium hydroxide solution was added at this temperature so that the pH was in the range of 7-9. The powder dispersed in water dissolved gradually and a clear aqueous solution of the sodium salt of polyaspartic acid was obtained). Sample solutions were filtered through Sartorius Minisart RC 25 (0.2 μm). Calibration was performed using narrowly distributed Na-PAA standards from Polymer Standard Service with molecular weights of M=1250 g/mol to M=130 500 g/mol. In addition, Na-acrylate having a molecular weight of M=96 and a PEG standard with M=620, which is synonymous with Na-PAA M=150, was used. Values outside this elution range were extrapolated. The evaluation limit was 122 g/mol.

Example 3

Calcium Carbonate Inhibition Test

A solution of NaHCO$_3$, MgSO$_4$, CaCl$_2$ and polymer was shaken at 70° C. for 2 h in a water bath. After filtration of the still warm solution through a 0.45 μm Milexfilter, the Ca content of the filtrate was determined complexometrically or by means of a Ca$^{2+}$ selective electrode and determined as % by comparison before/after the CaCO$_3$ inhibition (see formula 1).

| | |
|---|---|
| Ca$^{2+}$ | 215 mg/l |
| Mg$^{2+}$ | 43 mg/l |
| HCO$_3^-$ | 1220 mg/l |
| Na$^+$ | 460 mg/l |
| Cl$^-$ | 380 mg/l |
| SO$_4^{2-}$ | 170 mg/l |
| Polymer | 3 mg/l (cf. Table 2a) or 1.5 mg/l (cf. Table 2b) |
| Temperature | 70° C. |
| Time | 2 hours |
| pH | 8.0-8.5 |

CaCO$_3$ inhibition (%)=[(mg(Ca$^{2+}$) after 24 h−mg(Ca$^{2+}$)blank value after 24 h)/(mg(Ca$^{2+}$)zero value−mg(Ca$^{2+}$)blank value after 24 h)]×100   Formula 1

TABLE 2a

CaCO$_3$ inhibition at 3 mg/l polymer

| Example | Inhibition [%] |
|---|---|
| 2 | 61.2 |
| 4 | 59.2 |
| C2 | 43.9 |

TABLE 2b

CaCO$_3$ inhibition at 1.5 mg/l polymer

| Example | Inhibition [%] |
|---|---|
| 2 | 50.9 |
| C3 | 40.8 |

Example 4

Dishwashing Machine Test

The polymers were tested in the following phosphate-free formulation PF1.

TABLE 3

Dishwashing agent test formulation 1 (PF1)

| Constituent | PF 1 |
|---|---|
| Protease | 2.5 |
| Amylase | 1.0 |
| Non-ionic surfactant | 5 |
| Polymer | 10 |
| Sodium percarbonate | 10.2 |
| Tetraacetylethylenediamine | 4 |
| Sodium disilicate | 2 |
| Sodium carbonate | 19.5 |
| Sodium citrate dihydrate | 35 |
| Methylglycinediacetic acid, Na salt | 10 |
| Hydroxyethane-(1,1-diphosphonic acid) | 0.8 |

Values in % by weight based on the total amount of all components

The following experimental conditions were observed:

| | |
|---|---|
| Dishwasher: | Miele G 1222 SCL |
| Program: | 65° C. (with pre-rinse) |
| Crockery: | 3 knives (nickel chrome knives Karina, Solex Germany GmbH, D-75239 Eisingen) 3 drinking glasses Amsterdam 0.2 l 3 BREAKFAST DISHES "OCEAN BLUE" (MELAMINE) 3 porcelain dishes FLAT RIMMED PLATES 19 CM |
| Arrangement: | Knives in the cutlery rack, glasses in the upper basket, plates in the lower basket |
| Dishwashing agent: | 18 g |
| Soil addition: | 50 g of ballast soiling is thawed with the formulation added after the prerinse, composition see below |
| Wash temperature: | 65° C. |
| Water hardness: | 21° dH (Ca/Mg):HCO3 (3:1):1.35 |
| Wash cycles | 15; 1 h pause between each cycle (10 min door closed, 50 min door open) |
| Evaluation: | Visually after 15 cycles |

The crockery was evaluated after 15 cycles in a darkened chamber with light behind an aperture plate using a grading scale from 10 (very good) to 1 (very poor). Ratings were awarded of 1-10 for spotting (very many, intensive spots=1 to no spots=10) and for scaling (1=very intense scaling, 10=no scaling)

Composition of the Ballast Soil:

Starch: 0.5% potato starch, 2.5% gravy

Fat: 10.2% margarine

Protein: 5.1% egg yolk, 5.1% milk

Others: 2.5% tomato ketchup, 2.5% mustard, 0.1% benzoic acid, 71.5% water

Result:

The formulations with polyaspartic acid modified in accordance with the invention were characterized particularly by their very high scale-inhibiting effect with respect to inorganic and organic deposits on glass and knives. Furthermore, they increased the cleaning power of the dishwashing agent and favored the draining of water from the crockery such that particularly clear glasses and shiny metal cutlery items were obtained.

In Table 4 below, the added gradings for scale formation (B) and spotting (S) on knives and drinking glasses are listed.

TABLE 4

Test result for dishwashing test formulation 1 (PF1)

| Example | Knives (B + S) | Glasses (B + S) |
| --- | --- | --- |
| without polymer | 7.3 | 7.2 |
| 2 | 16.3 | 15.3 |
| 4 | 13.0 | 14.0 |
| C1 | 11.4 | 9.0 |

The invention claimed is:

1. A method for producing polyaspartic acids with a weight-average molecular weight (Mw) of 6000 to 15 000 g/mol, comprising the following steps:
   (i) polycondensation of
      (a) aspartic acid in the presence of
      (b) 1 to 15 mol % of methanesulfonic acid, based on the amount of aspartic acid used in (a)
      at a temperature of 170° C. to 230° C. for a time period of 1 minute to 50 hours;
   (ii) subsequent hydrolysis of the polycondensates with addition of a base; and
   (iii) optional acidification of the salt of polyaspartic acid obtained in (ii) with mineral acids or acidic ion exchangers, and
   wherein the polycondensation step further comprises the addition of water.

2. The method according to claim 1, wherein 2 to 13 mol % of methanesulfonic acid are used in step (i) (b), based on the amount of aspartic acid used in (a).

3. The method according to claim 1, wherein 3 to 10 mol % of methanesulfonic acid are used in step (i) (b), based on the amount of aspartic acid used in (a).

4. The method according to claim 1, wherein the polycondensation in step (i) is carried out at a temperature of 190° C. to 220° C.

5. The method according to claim 1, wherein the quotient of weight-average molecular weight (Mw) to number-average molecular weight (Mn) of the polyaspartic acid produced is not greater than 3.

6. The method according to claim 5, wherein the quotient is not greater than 2.5.

7. The method according to claim 1, wherein the base used in step (ii) is selected from the group consisting of aqueous sodium hydroxide solution, aqueous potassium hydroxide solution, calcium hydroxide, barium hydroxide, sodium carbonate, potassium carbonate, ammonia and ammonium hydroxide.

8. The method according to claim 1, wherein the mineral acid used in step (iii) is sulfuric acid or hydrochloric acid.

9. A polyaspartic acid obtainable by the method according to claim 1.

10. A composition comprising the polyaspartic acid according to claim 9.

11. The composition according to claim 10, wherein the composition is a dishwashing composition, a detergent composition or a cleaning composition.

12. A dishwashing composition comprising
   (a) 1-20% by weight polyaspartic acid according to claim 9;
   (b) 0-50% by weight complexing agents;
   (c) 0.1-80% by weight builders and/or co-builders;
   (d) 0.1-20% by weight non-ionic surfactants;
   (e) 0-30% by weight bleach, bleach activators and bleach catalysts;
   (f) 0-8% by weight enzymes; and
   (g) 0-50% by weight additives.

13. A solid detergent composition or cleaning composition comprising
   ($A_F$) 0.1 to 20% by weight polyaspartic acid according to claim 9,
   ($B_F$) 1 to 50% by weight surfactants,
   ($C_F$) 0.1 to 70% by weight builders, co-builders and/or complexing agents,
   ($D_F$) 0 to 30% by weight bleach system, and
   ($E_F$) 0.1 to 70% by weight detergent or cleaning ingredients.

14. A liquid or gel-like detergent composition and cleaning composition comprising
   ($A_L$) 0.1 to 20% by weight polyaspartic acid according to claim 9,
   ($B_L$) 1 to 80% by weight surfactants,
   ($C_L$) 0.1 to 50% by weight builders, co-builders and/or complexing agents,
   ($D_L$) 0 to 20% by weight bleach system,
   ($E_L$) 0.1 to 60% by weight detergent or cleaning ingredients, and
   ($F_L$) 0 to 98.7% by weight water.

15. A scale inhibitor and/or dispersant which comprises the polyaspartic acid according to claim 9.

16. A scale inhibitor and/or dispersant in water-conducting systems which comprises the polyaspartic acid according to claim 9.

17. An additive in dishwashing agents, detergents or cleaning agents which comprises the polyaspartic acid according to claim 9.

18. The additive according to claim 17, wherein the dishwashing agent is for machine dishwashing.

19. The method according to claim 3, wherein the polycondensation in step (i) is carried out at a temperature of 200° C. to 220° C. for 1 hour to 15 hours.

20. The dishwashing composition as claimed in claim 12, wherein the composition comprises
   (a) 1-20% by weight said polyaspartic acid;
   (b) 3-50% by weight complexing agents;
   (c) 0.1-80% by weight builders and/or co-builders;
   (d) 0.5-10% by weight non-ionic surfactants;
   (e) 0.1-30% by weight bleach, bleach activators and bleach catalysts;
   (f) 0-8% by weight enzymes; and
   (g) 0-50% by weight additives.

* * * * *